United States Patent [19]

Kitade

[11] Patent Number: 4,498,353
[45] Date of Patent: Feb. 12, 1985

[54] AIR BREATHER STRUCTURE FOR OIL SEALS IN AN AUTOMATIC TRANSMISSION

[75] Inventor: Nobumitsu Kitade, Tokyo, Japan

[73] Assignee: Fuji Jukogyo Kabushiki Kaisha, Tokyo, Japan

[21] Appl. No.: 424,651

[22] Filed: Sep. 27, 1982

[30] Foreign Application Priority Data

Sep. 30, 1981 [JP] Japan ................................. 56-155564

[51] Int. Cl.³ ...................... F16H 57/02; F16H 57/04; B65D 53/00; F16J 15/00
[52] U.S. Cl. .................................. 74/606 R; 74/467; 277/59; 277/29
[58] Field of Search ................ 74/467, 606 R, 606 A; 277/29, 59, 63, 153, 79

[56] References Cited

U.S. PATENT DOCUMENTS

| 2,797,940 | 7/1957 | Michener, Jr. et al. | 277/59 |
| 3,119,623 | 1/1964 | Shevchenko | 277/59 |
| 3,145,582 | 8/1964 | Wagner | 74/606 R |
| 3,472,519 | 10/1969 | Gehret | 277/59 |
| 3,550,970 | 12/1970 | Hjerten | 277/59 |
| 3,575,426 | 4/1971 | Durham | 277/59 |
| 3,717,352 | 2/1973 | Jansing et al. | 277/59 |
| 4,011,776 | 3/1977 | Kodama et al. | 74/606 R |
| 4,196,910 | 4/1980 | Aizu | 277/59 |
| 4,198,063 | 4/1980 | Shimizu et al. | 277/79 |
| 4,252,031 | 2/1981 | Nishimura et al. | 74/606 R |
| 4,384,724 | 5/1983 | Derman | 277/59 |
| 4,408,765 | 10/1983 | Adelmann, Jr. | 277/29 |

FOREIGN PATENT DOCUMENTS

| 770499 | 10/1967 | Canada | 277/59 |
| 880243 | 3/1943 | France | 277/59 |
| 896048 | 5/1962 | United Kingdom | 277/29 |

Primary Examiner—Lawrence J. Staab
Assistant Examiner—Michael D. Bednarek
Attorney, Agent, or Firm—Martin A. Farber

[57] ABSTRACT

An air breather structure for oil seals in an automatic transmission having a final reduction device and an automatic transmission device. Each oil seal comprises a pair of sealing members with a space therebetween. A differential case for the final reduction device and an automatic transmission case are coupled at ends thereof interposing a gasket. Two rotating shafts extend across the gasket for transmitting an output of the automatic transmission to front and rear wheels of a vehicle for four-wheel driving. The oil seals are provided around the rotating shafts respectively. Both of the oil seals are located in the automatic transmission case and the space of each oil seal is communicated with the atmosphere through passages including cavities provided in both cases and an opening formed in the gasket and a hole formed in an upper portion of the differential case.

7 Claims, 5 Drawing Figures

4,498,353

AIR BREATHER STRUCTURE FOR OIL SEALS IN AN AUTOMATIC TRANSMISSION

BACKGROUND OF THE INVENTION

The present invention relates to an air breather structure for oil seals in an automatic transmission including an automatic transmission device adjacent to a case for a final reduction device, and more particularly to a breather structure for an automatic transmission device in a four-wheel drive vehicle.

Such an automatic transmission device is lubricated with an automatic transmission fluid (ATF) and the final reduction device including a differential is lubricated with a differential oil different from the ATF in quality. In such an automatic transmission, both devices are separated by a gasket and an oil seal is provided around a rotating shaft extending across the gasket in order to prevent the mixing of both oils. In an automatic transmission device for a four-wheel drive automobile, two rotating shafts extend across the gasket. One of the rotating shafts is a hub of a reduction drive gear and the other is a drive pinion shaft in the final reduction device which extends in the opposite direction for transmitting the power of the engine to a different pair of wheels than the wheels driven through the final reduction device. Therefore, two oil seals are provided around both rotating members. Each oil seal is provided with a pair of sealing members at a space and the space is communicated with the atmosphere through an air breather passage for ensuring the sealing effect. In an air breather structure employing a pipe system, there are difficulties namely a space for the pipe system must be provided in the transmission and trouble occurs such as leakage from connections of pipes, immersion of water into the pipe, and breakage of the pipe. It has been proposed to provide the air breather passage in the junction of the final reduction case and the automatic transmission case. However, since a plurality of oil passages are formed in the junction of the automatic transmission device, it is difficult to provide an air breather passage in the junction.

SUMMARY OF THE INVENTION

Accordingly, it is an object of the present invention to provide an air breather structure which can be simply provided in the junction by using cavities and grooves which are inherently formed in both cases.

The present invention will be more apparent from the following description made with reference to the accompanying drawings.

DETAILED DESCRIPTION OF THE PREFERRED EMBODIMENTS

Figure 1:
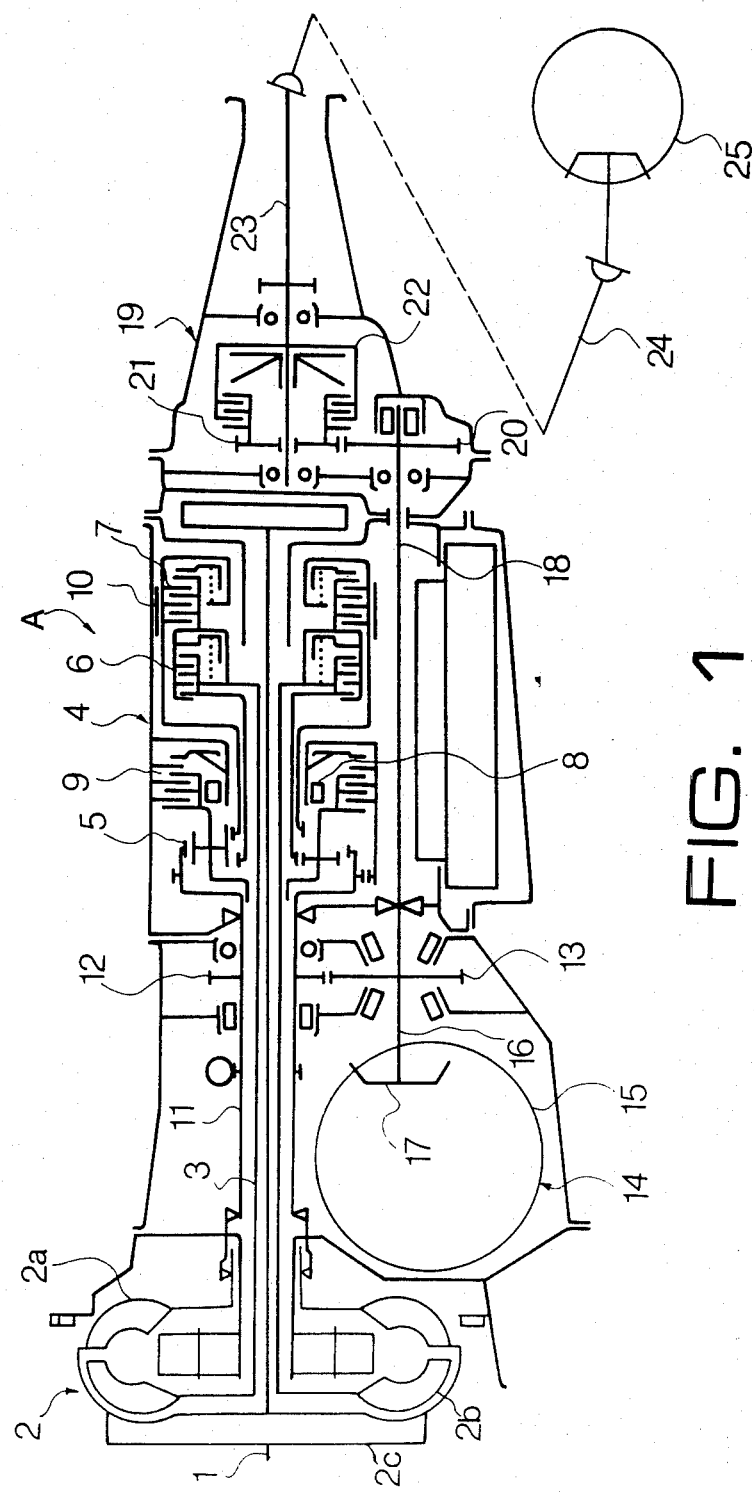
FIG. 1 is a schematic axial view showing a transmission system for a four-wheel automobile in which an air breather structure of the present invention is used.

Referring to FIG. 1, numeral 1 designates a crankshaft of an internal combustion engine (not shown) mounted on a front portion of a vehicle (not shown). The crankshaft 1 of the engine is operatively connected with a torque converter 2 of an automatic transmission A.

The automatic transmission A comprises the torque converter 2, an automatic transmission device 4, and a final reduction device 14 for front wheels (not shown) of the vehicle.

The torque converter 2 comprises a pump impeller 2a and a turbine 2b. The pump impeller 2a is in direct connection with the engine crankshaft 1 through a drive plate 2c. A turbine shaft 3 extends from the turbine 2b to the automatic transmission device 4.

The automatic transmission device A comprises a planetary gear 5, clutches 6 and 7 for selectively transmitting the output of the turbine shaft 3 to the planetary gear 5, a one-way clutch 8, a brake 9 and brake band 10 for selectively locking the elements of the planetary gear 5.

The output of the automatic transmission device is transmitted to an output shaft 11 on which a reduction drive gear 12 is securely mounted and which in turn engages with a driven gear 13. The driven gear 13 is securely mounted on a shaft 16 which is integral with a drive pinion 17. The drive pinion 17 engages with a crown gear 15 of the final reduction device 14 for the front wheels. The shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A fluid pressure controlled friction clutch 22 of the multiple-disk type is mounted on the rear drive shaft 23 for engaging the gear 21 with the shaft 23. The rear drive shaft 23 is further operatively connected to a final reduction device 25 for rear wheels (not shown) of the vehicle through a propeller shaft 24. Thus, the rear wheels are driven by engaging the clutch 22 along with the front wheels.

Figure 2:
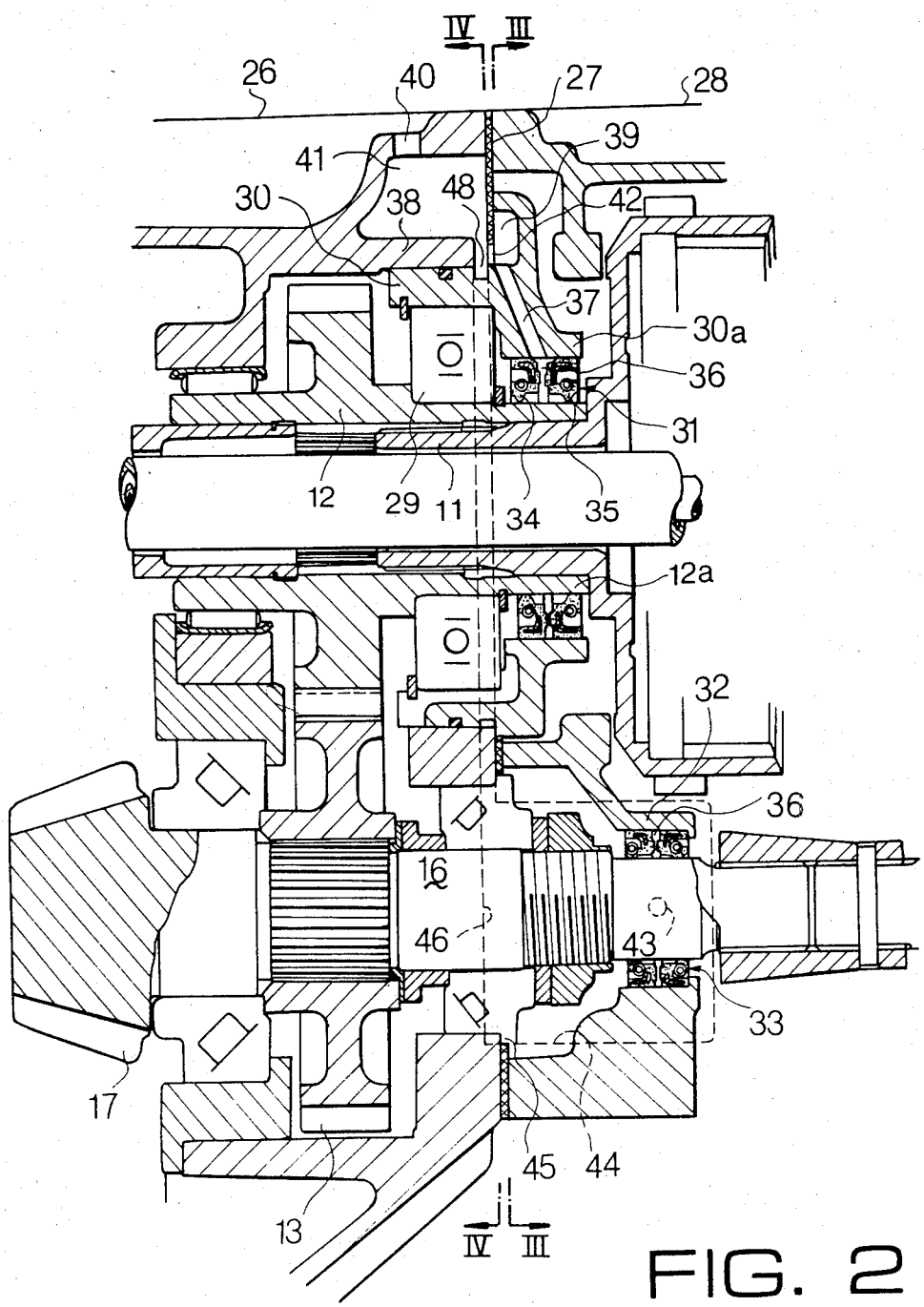
FIG. 2 is an enlarged axial sectional view of a portion of FIG. 1 showing the air breather structure of the present invention.

Referring to FIG. 2, a differential case 26 of the final reduction device 14 and a case 28 of the automatic transmission device 4 are coupled through a gasket 27 so as to water-tightly separate interiors of both cases. The reduction drive gear 12 is rotatably supported by a ball bearing 29 at a hub 12a extending into the automatic transmission device 4. The outer race of the bearing 29 is securely mounted in a holder 30 which is mounted in a cylindrical portion 38 of the differential case 26. The holder 30 has a cylindrical projection 30a extending into the case 28. In a cylindrical space between cylindrical projections of the hub 12a and the holder 30, a first oil seal 31 is charged. On the other hand, a cylindrical holding portion 32 is formed in the case 28 and a second oil seal 33 is provided in the space between the holding portion 32 and the shaft 16 of the drive pinion 17. Each oil seal comprises a pair of sealing members 34 and 35 which are disposed opposite each other with a space 36 therebetween. The space 36 is communicated with the atmosphere as will be described hereinafter.

Figure 3:
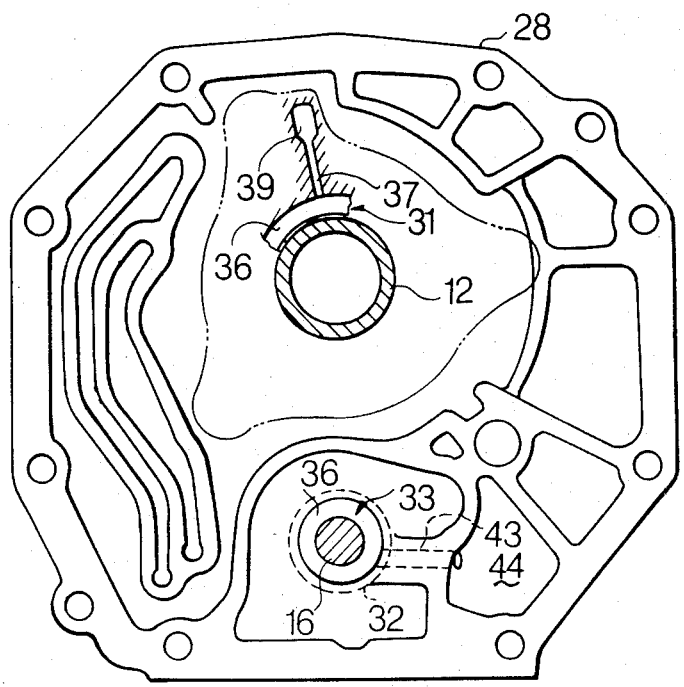
FIG. 3 is a sectional view taken along the line III—III of FIG. 2.

An air breather passage 37 is formed in the holder 30 so as to communicate the space 36 of the oil seal 31 with a recess 39 formed in an upper portion of the holder (FIG. 2 and FIG. 3). The recess 39 is opened at the end wall of the automatic transmission case 28, facing the end of the differential case 26.

Figure 4:
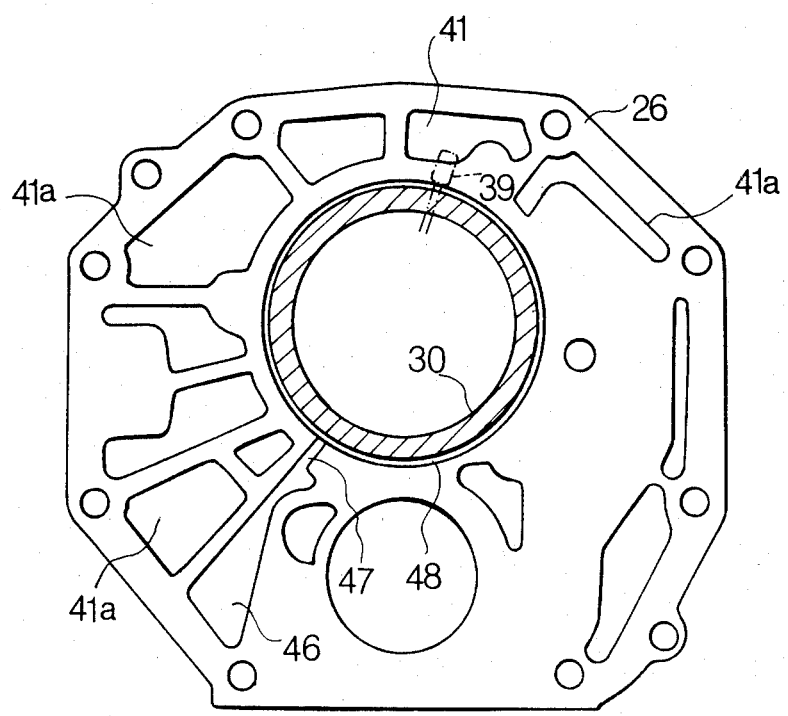
FIG. 4 is a sectional view taken along the line IV-IV of FIG. 2.
Figure 5:
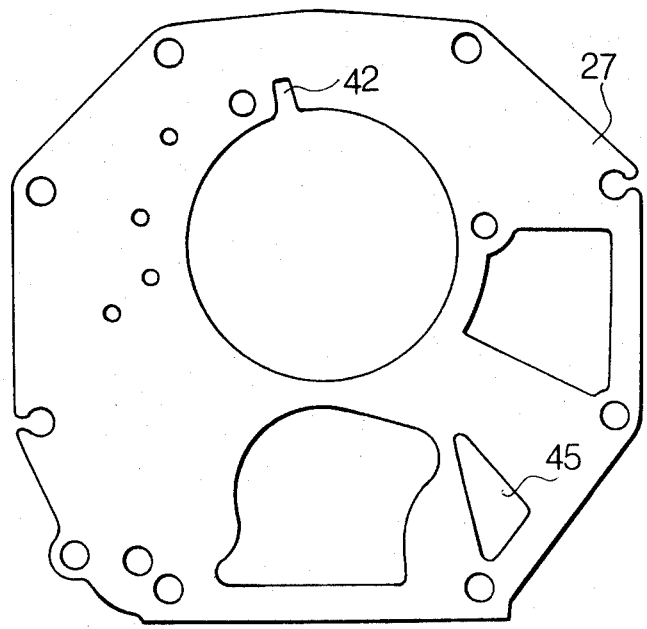
FIG. 5 is a front view of a gasket.

As shown in FIG. 4, a plurality of open cavities 41a are formed in the end of the differential case 26 to decrease the weight of the case. In accordance with the present invention, one of the cavities 41a is used as an air breather recess 41. The air breather recess 41 communicates with the recess 39 through an opening 42 provided in the gasket 27 as shown in FIG. 5. The recess 41 is communicated with the atmosphere through a hole 40 formed in the case 26. Thus, the differential space 36 of the oil seal 31 is communicated with the atmosphere through the passage 37, recess 39, opening 42, recess 41, and hole 40.

Referring to FIG. 3, the space 36 of the second oil seal 33 is communicated with a recess 44 through a horizontal passage 43 formed in the automatic transmission case 28. The recess 44 is one of several open cavities formed in the case 28. The recess 44 is communicated with a recess 46 of the differential case 26 through an opening 45 formed in the gasket 27. The recess 46 is communicated with an annular groove 48 formed in the peripheral portion of the holder 30 via a passage 47 in the differential case 26. The annular groove 48 is communicated with the recesses 39 at an end portion of the cylindrical portion 38 as shown in FIG. 2. Thus, the spaces in the oil seals 31 and 33 are cummunicated with the atmosphere through passages provided at the junction of the cases 26 and 28 as described below.

The first space 36 of the oil seal 31 is communicated with the atmosphere passing through the passage 37, recess 39, opening 42 of the gasket 27, recess 41 and hole 40. On the other hand, the space of the second oil seal 33 is communicated with the atmosphere through the passage 43, recess 44, opening 45 of the gasket 27, recess 46, passage 47, annular groove 48, and recess 39 etc. Thus, the space 36 of each oil seal is at atmospheric pressure to thereby prevent leakage of oil in one of the cases to the other case and vice versa.

From the foregoing it will be understood that the present invention provides an air breather structure which comprises upwardly extending passages provided along the junction so as to communicate with the atmosphere via a hole provided in an upper portion of one case. The passages are formed by cavities inherently provided in the cases for decreasing the weight. Thus, the passage can be formed without greatly changing structures of the differential case and automatic transmission case and without increasing the length of passage.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An improved air breather structure for oil seals in an automatic transmission for a vehicle wherein each oil seal comprises a pair of sealing members with a space therebetween, said automatic transmission comprises a final reduction device provided in a differential case and an automatic transmission device provided in an automatic transmission case, both the cases coupled at corresponding ends of the respective cases interposing a gasket therebetween, two rotating shafts extending across the gasket for transmitting an output of the automatic transmission to front and rear wheels of the vehicle for four-wheel driving, said oil seals being provided around the rotating shafts, respectively, the improvement comprising each of said cases forming a plurality of cavities at said ends of the cases, respectively, reducing the weight of the cases,
a first passage provided in one of said cases communicating the space of the first oil seal with a recess formed adjacent the end of said first passage;
an opening formed in said gasket communicating with said recess;
a first means provided in a first of said cavities in an upper portion of the other of said cases for communicating said opening with the atmosphere;
a second passage provided in one of the cases for communicating the space of the second oil seal with a second of said cavities; and
a second means including another of said cavities for communicating said second passage with said first means.

2. The air breather structure according to claim 1 further comprising
a holder means secured to the differential case for supporting a reduction drive gear of said automatic transmission, the reduction drive gear having a hub inwardly spaced from said holder means forming an annular space, said hub constituting one of the rotating shafts,
said first oil seal is provided in the annular space between the holder means and said hub of said reduction drive gear, and
said first passage and said recess are formed in the holder means in said automatic transmission case.

3. The air breather structure according to claim 2 wherein
another of the rotating shafts is a shaft of a drive pinion for driving the front and rear wheels and a cylindrical holding portion formed in the automatic transmission case annularly spaced about said shaft of the drive pinion,
said second oil seal is provided between said shaft of the drive pinion and said cylindrical holding portion.

4. The air breather structure according to claim 3 wherein
said second passage in provided in said cylindrical holding portion and said automatic transmission case adjacent said end thereof, and
said second means including said third cavity and an annular groove formed in the differential case in said holder means around said holder means and a third passage formed in the differential case communicating said third cavity with said annular groove,
said annular groove communicates with said first means at a portion of the differential case, said portion being stepped-back from said end of the differential case.

5. The air breather structure according to claim 4, wherein
said first and second passages extend upwardly inclined and said second passage is substantially horizontal.

6. The air breather structure according to claim 5, wherein said first means comprises in said differential case a fourth of said cavities an opening to atmosphere communicating with said fourth cavity.

7. The air breather structure according to claim 6, wherein
said holder means expands into said differential case, abuts said gasket at said recess and is secured to said differential case at said stepped-back portion.

* * * * *